United States Patent
Fukuda

(10) Patent No.: US 8,665,348 B2
(45) Date of Patent: Mar. 4, 2014

(54) IMAGE PROCESSING APPARATUS AND METHOD USING FORWARD AND INVERSE LOCAL ADAPTATION PROCESSING AND DYNAMIC RANGE PROCESSING

(75) Inventor: Yasuo Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 12/548,174

(22) Filed: Aug. 26, 2009

(65) Prior Publication Data

US 2010/0053376 A1    Mar. 4, 2010

(30) Foreign Application Priority Data

Sep. 1, 2008 (JP) ................... 2008-223919

(51) Int. Cl.
*H04N 9/68* (2006.01)
(52) U.S. Cl.
USPC ....................................... 348/235; 348/222.1
(58) Field of Classification Search
USPC .............................................. 348/235, 222.1
See application file for complete search history.

(56) References Cited

U.S. PATENT DOCUMENTS

| | | | |
|---|---|---|---|
| 2001/0016078 A1* | 8/2001 | Go | 382/240 |
| 2005/0078122 A1* | 4/2005 | Ohga | 345/589 |
| 2006/0181553 A1* | 8/2006 | Choe et al. | 345/690 |

FOREIGN PATENT DOCUMENTS

| | | |
|---|---|---|
| JP | 2005-210526 A | 8/2005 |
| JP | 2007-174126 A | 7/2007 |

OTHER PUBLICATIONS iCAMO6: A Refined Image Appearance Model for HDR Image Rendering,Journal of Visual Communication, 2007 Jiangtao Kuang, et al.
A Multiscale Retinex for Bridging the Gap Between Color Images and the Human Observation of Scenes, IEEE Transactions on Image Processing, vol. 6, No. 7 Jul. 1997, Daniel J. Jobson, et al.

* cited by examiner

*Primary Examiner* — Usman Khan
(74) *Attorney, Agent, or Firm* — Cowan, Liebowitz & Latman, P.C.

(57) ABSTRACT

A captured image and capture conditions of an input device when the captured image was captured are input, and viewing conditions when a reproduced image, which is reproduced by an output device, is viewed are input. A first perceived image is generated from the captured image by a forward conversion of local adaptation processing that conforms to information, which indicates viewing angle, distance to a subject and image resolution of the captured image, included in the capture conditions. A second perceived image is generated by converting a dynamic range of the first perceived image to a dynamic range of the output device. A reproduced image, which is supplied to the output device, is generated from the second perceived image by an inverse conversion of the local adaptation processing that conforms to information, which relates to viewing distance and size of the reproduced image, included in the viewing conditions.

9 Claims, 13 Drawing Sheets

F I G. 14
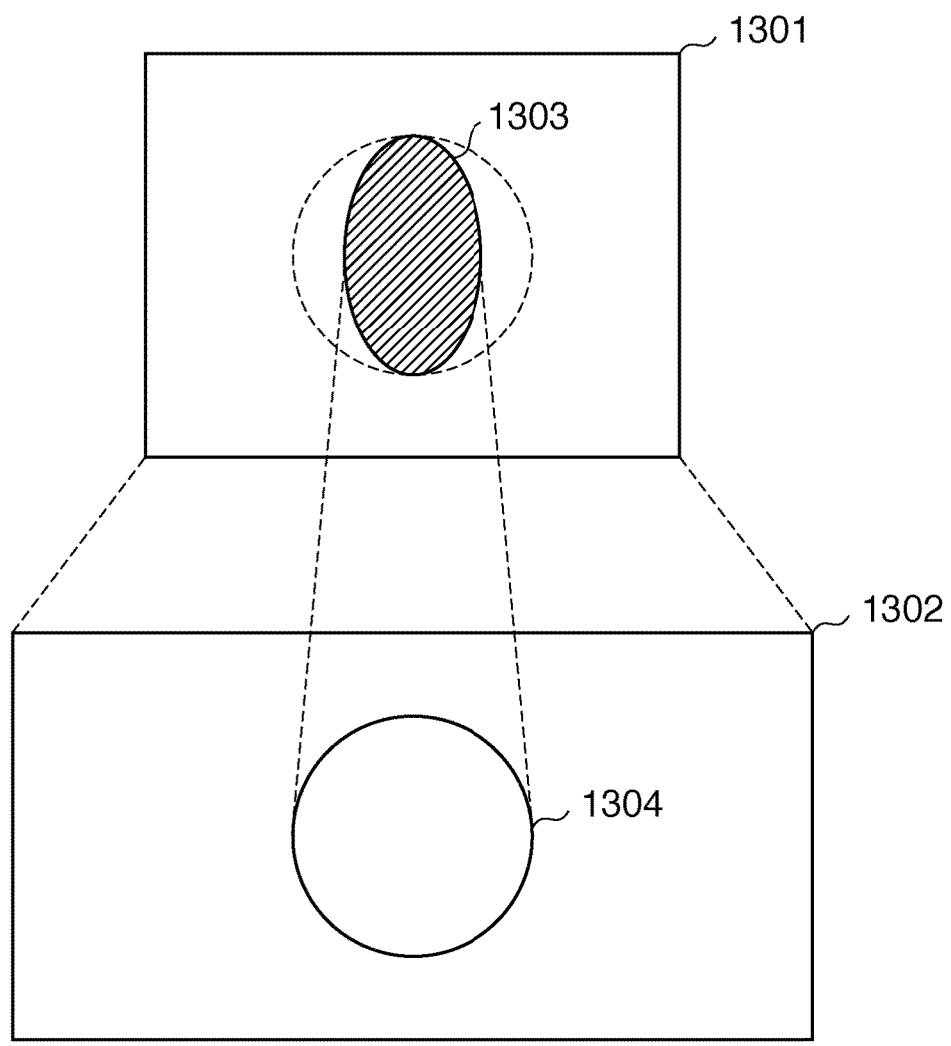

IMAGE PROCESSING APPARATUS AND METHOD USING FORWARD AND INVERSE LOCAL ADAPTATION PROCESSING AND DYNAMIC RANGE PROCESSING

BACKGROUND OF THE INVENTION

1. Field of the Invention

The present invention relates to image processing which takes into consideration the appearance of a scene and the appearance of an image.

2. Description of the Related Art

The percentage of homes in Japan with digital cameras at the present time has exceeded 50% (2004 Cabinet's Survey of Consumption Trends), and taking pictures by digital camera has become commonplace.

When a certain scene is captured by a digital camera outdoors, etc., there are cases where the luminance range of the subject (or scene) is broader than the luminance range that is capable of capture. In such cases, a subject that is outside the luminance range that is capable of capture is such that its tone information cannot be recorded, giving rise to so-called highlight-detail loss and shadow-detail loss. For example, when the picture of a person is taken outdoors in fair weather with exposure made to conform to the person, highlight-detail loss occurs in image areas of background sky or clouds, or shadow-detail loss may occur in image areas in the shadows of trees. On the other hand, human vision has a characteristic called "local adaptation" characteristic whereby the state of adaptation is changed over in response to the brightness of a viewed area so that brightness and color are perceived, thus enabling tones to be perceived in both bright and dark areas. This means that there are cases where the impression received when a real-world scene is viewed directly and the impression received when the captured image of this scene is viewed differ.

The high-dynamic-range imaging (HDR) technique is one technique for solving this problem. The HDR technique is broadly classified into an HDR capture technique and HDR reproduction technique.

The HDR capture technique is a technique that expands the dynamic range of capture in such a manner that highlight-detail loss and shadow-detail loss will not occur, and one known method thereof involves combining images captured by a plurality of exposures. An image acquired by the HDR capture technique will be referred to as an "HDR image" below.

The HDR reproduction technique is a technique in which an HDR image having a broad dynamic range is favorably reproduced by a display device or output device (the latter in the discussion below) having a narrow dynamic range. Here dynamic range is compressed in order to accommodate a disparity between the two dynamic ranges. Various methods have been proposed thus far with regard to the compression of dynamic range.

For example, iCAM06 proposed by J. Kuang (see Kuang, J., Johnson, G. M., Fairchild M. D. "iCAM06: A refined image appearance model for HDR image rendering", Journal of Visual Communication, 2007) is a dynamic-range compression method that is based upon the concept of using an output device to reproduce an impression received when a scene is viewed. iCAM06 technique first simulates brightness and color, which a human has perceived in a real-world scene, processing with an HDR image. Next, the technique converts brightness and color of HDR image to brightness and color reproducible by an output device or display device, and finally converts these to signal values of the output device or display device. The simulation necessitates a "human vision model" obtained by modeling the mechanism by which a human perceives brightness and color. In order that brightness and color perceived by a human may be simulated more accurately, iCAM06 uses a human vision model that reflects the local adaptation mentioned above.

In order to simulate the impression of a viewed scene from an HDR image taking local adaptation into consideration, it is necessary to set an area (referred to as "size of adaptive visual field") in which local adaptation is produced. In iCAM06, information as to how a real-world scene was viewed by a human is indefinite and the size of the adaptive visual field is set uniformly. In other words, regardless of the image, the size of the adaptive visual field is given as a ratio with respect to image width (e.g., 50%). With iCAM06, therefore, there are cases where the impression of a subject at the time of actual capture cannot be simulated correctly.

Further, in a case where a reproduced image (a monitor image or printout) is viewed as well, local adaptation should occur in a manner similar to that at the time of image capture. However, iCAM06 does not take into consideration local adaptation with regard to a reproduced image.

SUMMARY OF THE INVENTION

In one aspect, an image processing method comprising the steps of: inputting a captured image and capture conditions of an image input device when the captured image was captured; inputting viewing conditions when a reproduced image, which is reproduced by an image output device, is viewed; generating a first perceived image from the captured image by a forward conversion of local adaptation processing that conforms to information, which indicates viewing angle, distance to a subject and image resolution of the captured image, included in the capture conditions; generating a second perceived image by converting a dynamic range of the first perceived image to a dynamic range of the image output device; and generating a reproduced image, which is supplied to the image output device, from the second perceived image by an inverse conversion of the local adaptation processing that conforms to information, which relates to viewing distance and size of the reproduced image, included in the viewing conditions.

According to this aspect, the impression received when a real-world scene is viewed and the impression received when the reproduced image is viewed are made to conform (or made to approach each other).

Further features of the present invention will become apparent from the following description of exemplary embodiments with reference to the attached drawings.

BRIEF DESCRIPTION OF THE DRAWINGS

FIG. 14 is a diagram illustrating the relationship between a change in aspect ratio of an image and shape of an adaptive visual field.

DESCRIPTION OF THE EMBODIMENTS

Image processing according to embodiments of the present invention will be described in detail with reference to the drawings.

First Embodiment

[Configuration of Apparatus]

Figure 1:
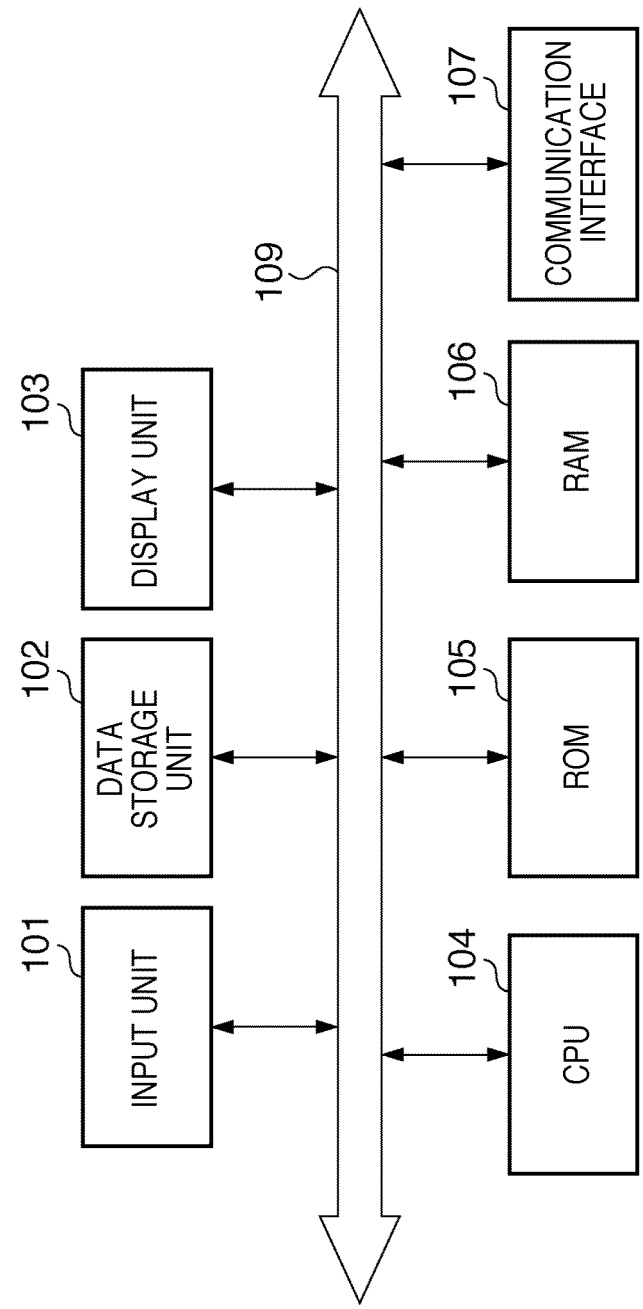
FIG. 1 is a block diagram illustrating the configuration of an image processing apparatus according to an embodiment of the present invention.

FIG. 1 is a block diagram illustrating the configuration of an image processing apparatus according to an embodiment of the present invention.

A microprocessor (CPU) 104 employs a random-access memory (RAM) 106 as a work memory and executes a program that has been stored in a memory such as a read-only memory (ROM) 105 and the like. The CPU 104 controls these components via a system bus 109 to execute image processing described later. The ROM 105 stores a program and data necessary for controlling the image processing apparatus as well as a program for image processing described later.

An input unit 101 is a keyboard and pointing device for accepting input of designations and data from a user. A mouse, track ball, track pad and tablet can be mentioned as examples of the pointing device. In a case where this embodiment is applied to a device such as a digital camera or printer, the input unit 101 may be buttons, numeric keys or a model dial, etc. Alternatively, the input unit 101 may be a software keyboard in which a keyboard is implemented by software.

A data storage unit 102 stores data such as image data. The data storage unit 102 is usually implemented in the form of a hard-disk or optical-disk drive or by a reader/writer of a memory card, etc. A partial area of the RAM 106 may be used as the data storage unit 102. The above-mentioned programs can also be stored in the data storage unit 102.

In accordance with control by the CPU 104, a display unit 103 displays a graphical user interface (GUI) and images before and after image processing. The display unit 103 may be implemented in the form of a touch-sensitive screen, in which case it is possible for an input from the screen to be handled as an input from the input unit 101.

A communication interface (I/F) 107 is for interfacing the image processing apparatus with an external device. By way of example, a wired or wireless network interface, a serial bus interface such as a USB (Universal Serial Bus) or IEEE 1394, or an infrared IrDA interface can be utilized as the communication interface 107.

[Viewed State of Scene and Image]

Figure 2:
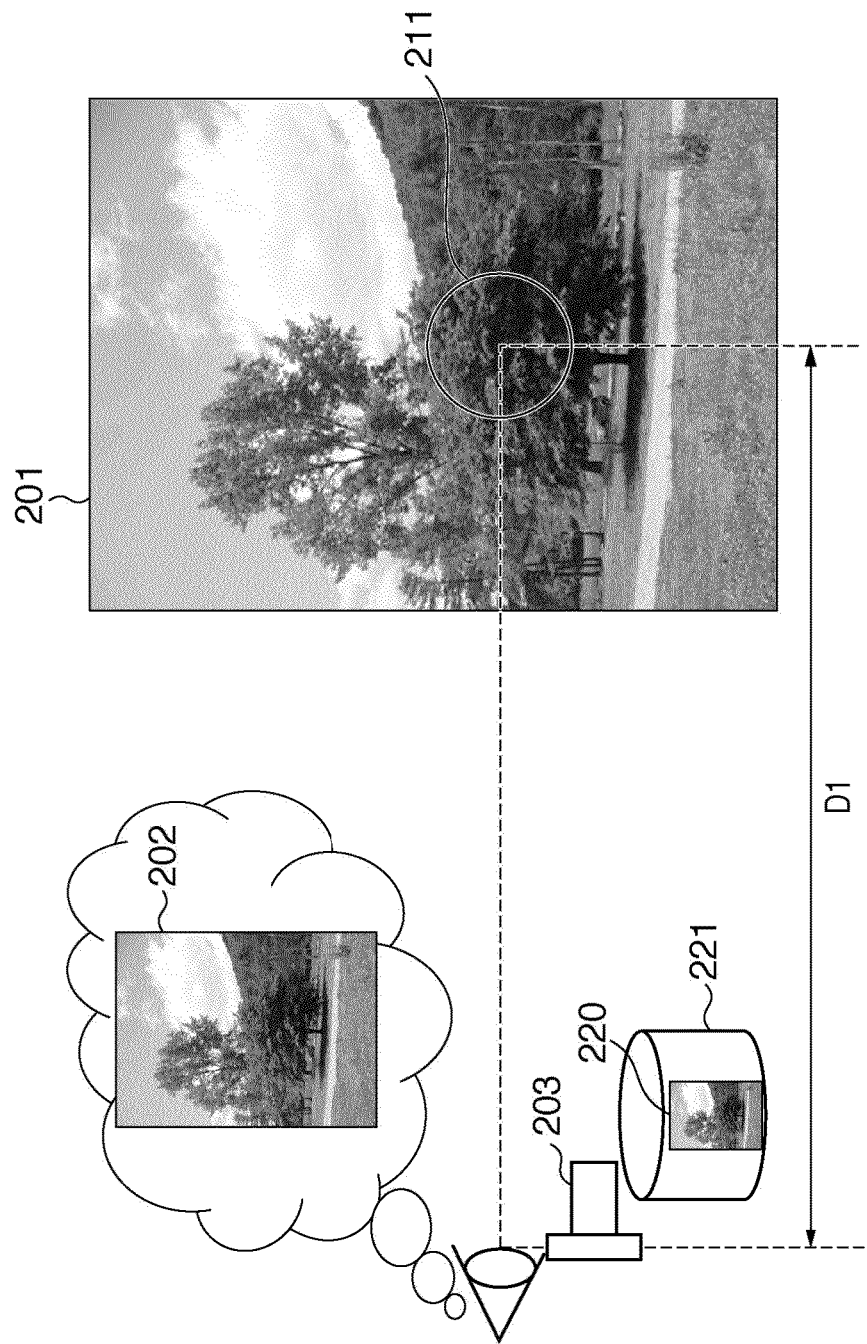
FIG. 2 is a diagram useful in describing the viewed state of a scene.

FIG. 2 is a diagram useful in describing the state in which a scene is viewed.

As shown in FIG. 2, the user of a digital camera (referred to simply as a "camera" below) 203 views a real-world scene 201 and perceives the real-world scene 201 as an image 202. The distance between the subject in the real-world scene 201 and the camera 203 (the image sensor of the camera) is D1. It should be noted that the distance between the subject and the user, who is the viewer of the scene, also can be satisfactorily approximated by D1. Further, an image 220, which is the result of capturing the real-world scene 201, is stored on a recording medium (e.g., a memory card) 221 of the camera 203.

In this embodiment, human perception of the real-world scene 201 is represented as the image (the "perceived image" below) 202. Although the perceived image 202 is without substance, in this embodiment the perceived image 202 is predicted, based upon a certain local adaptation model, using the image (the "captured image" below) 220 captured by the camera 203.

Further, an area 211 shown in FIG. 2 indicates a zone that has local influence upon perception of the scene at the center thereof. The area 211 can be set by a viewing angle θ.

Figure 3:
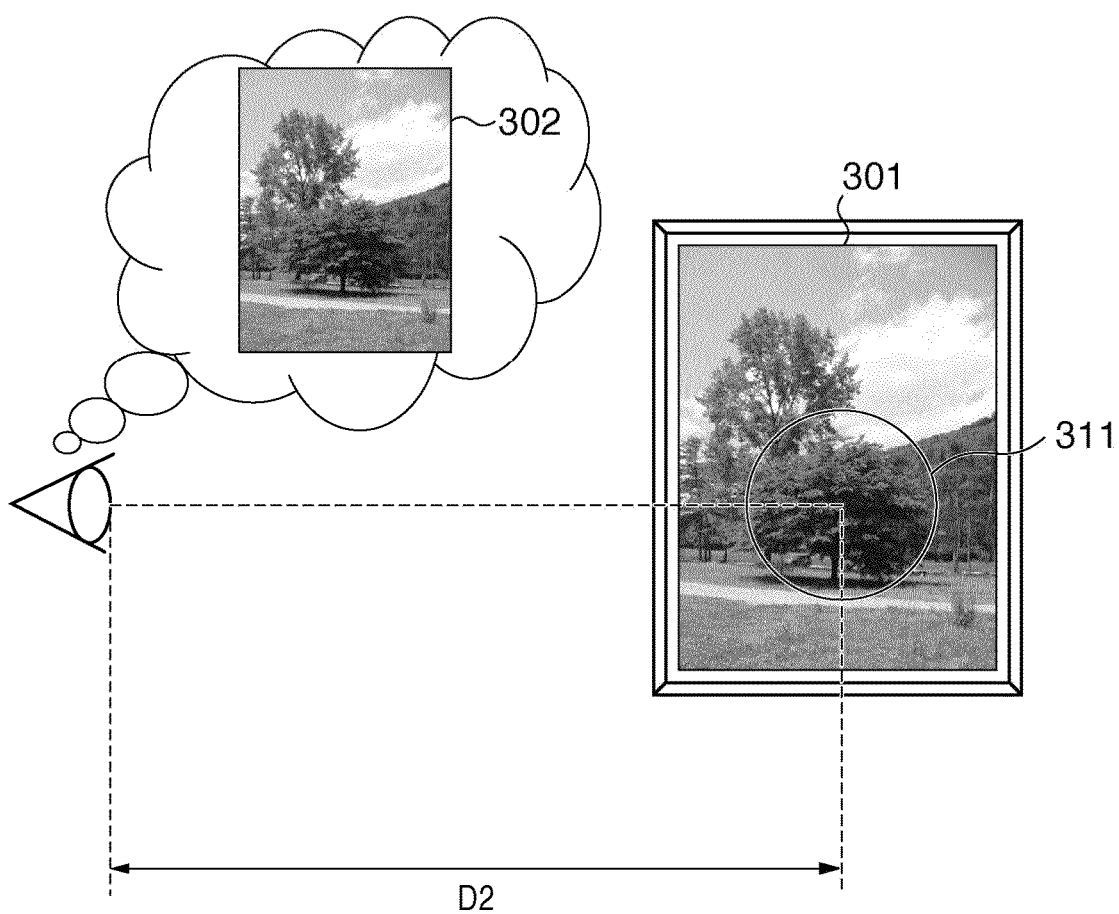
FIG. 3 is a diagram useful in describing the viewed state of, e.g., a monitor display or printout obtained by reproducing a captured image.

FIG. 3 is a diagram useful in describing the state in which, e.g., a monitor display or printout, obtained by reproducing the captured image 220, is viewed.

As shown in FIG. 3, an image 301 is one obtained by supplying the captured image 220 to an output device and then reproducing the same. Here it is assumed that the user is viewing a printout image (the "reproduced image" below) 301. The distance between the reproduced image 301 and the user who is the viewer of the reproduced image 301 is D2.

An image 302 represents the user's perceived image of the reproduced image 301. Although the perceived image 302 is without substance, as in the case of perceived image 202, in this embodiment the perceived image 302 is predicted, based upon a certain local adaptation model, using the reproduced image 301.

Further, an area 311 shown in FIG. 3 indicates a zone that has local influence upon perception of the scene at the center thereof. The area 311 can be set by the viewing angle θ.

Figure 4:
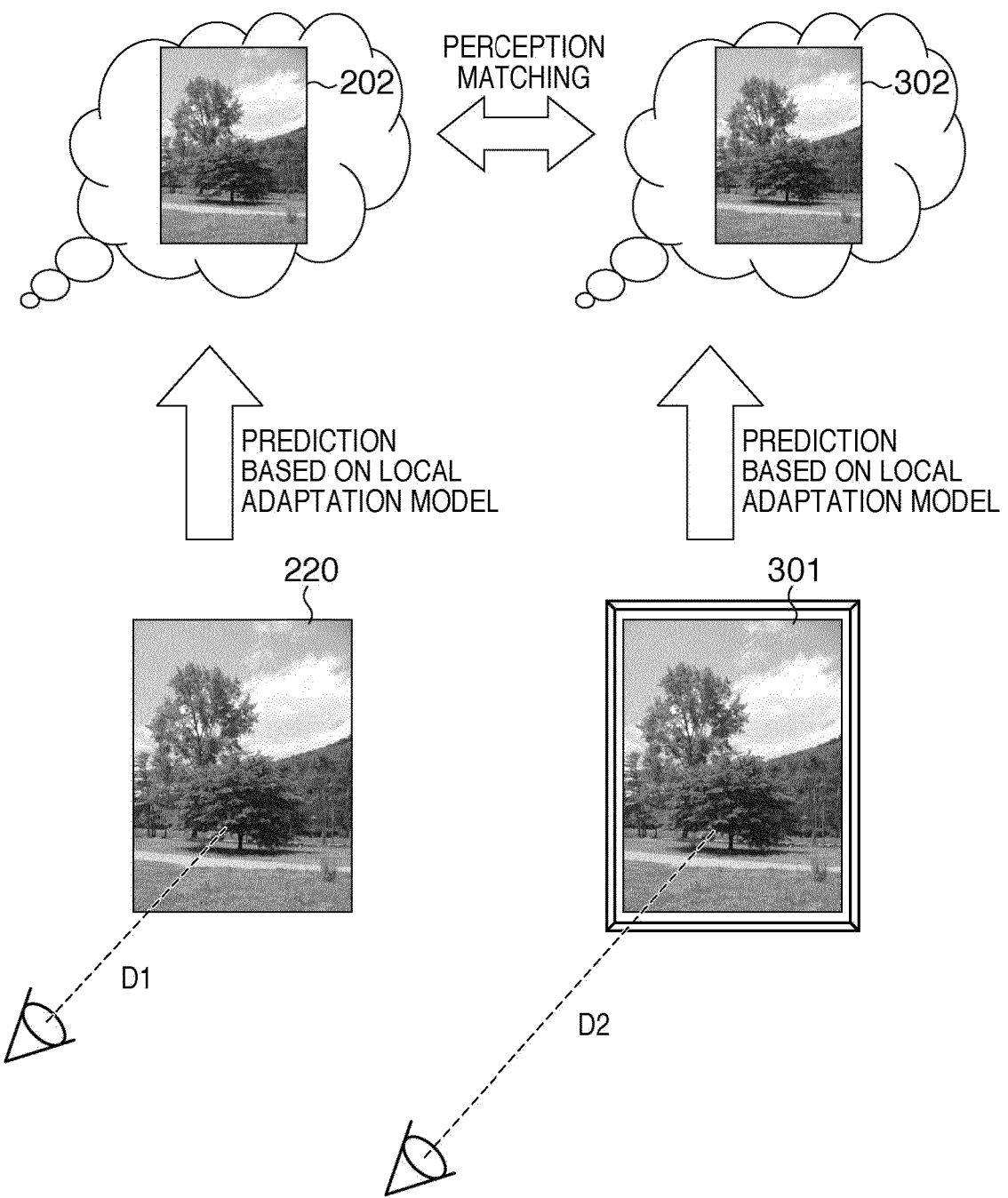
FIG. 4 is a diagram illustrating the relationship between viewing of a real-world scene and viewing of the reproduced image.

FIG. 4 is a diagram illustrating the relationship between viewing of the real-world scene 201 and viewing of the reproduced image 301.

This embodiment predicts the perceived image 202, based upon a local adaptation model, using the captured image 220 instead of the real-world scene 201. Similarly, the perceived image 302 is predicted, based upon a local adaptation model, using the reproduced image 301. Perception matching is performed between the perceived image 202 predicted from the captured image 220 (the input side) and the perceived image 302 predicted from the reproduced image 301 (the output side).

Figure 5:
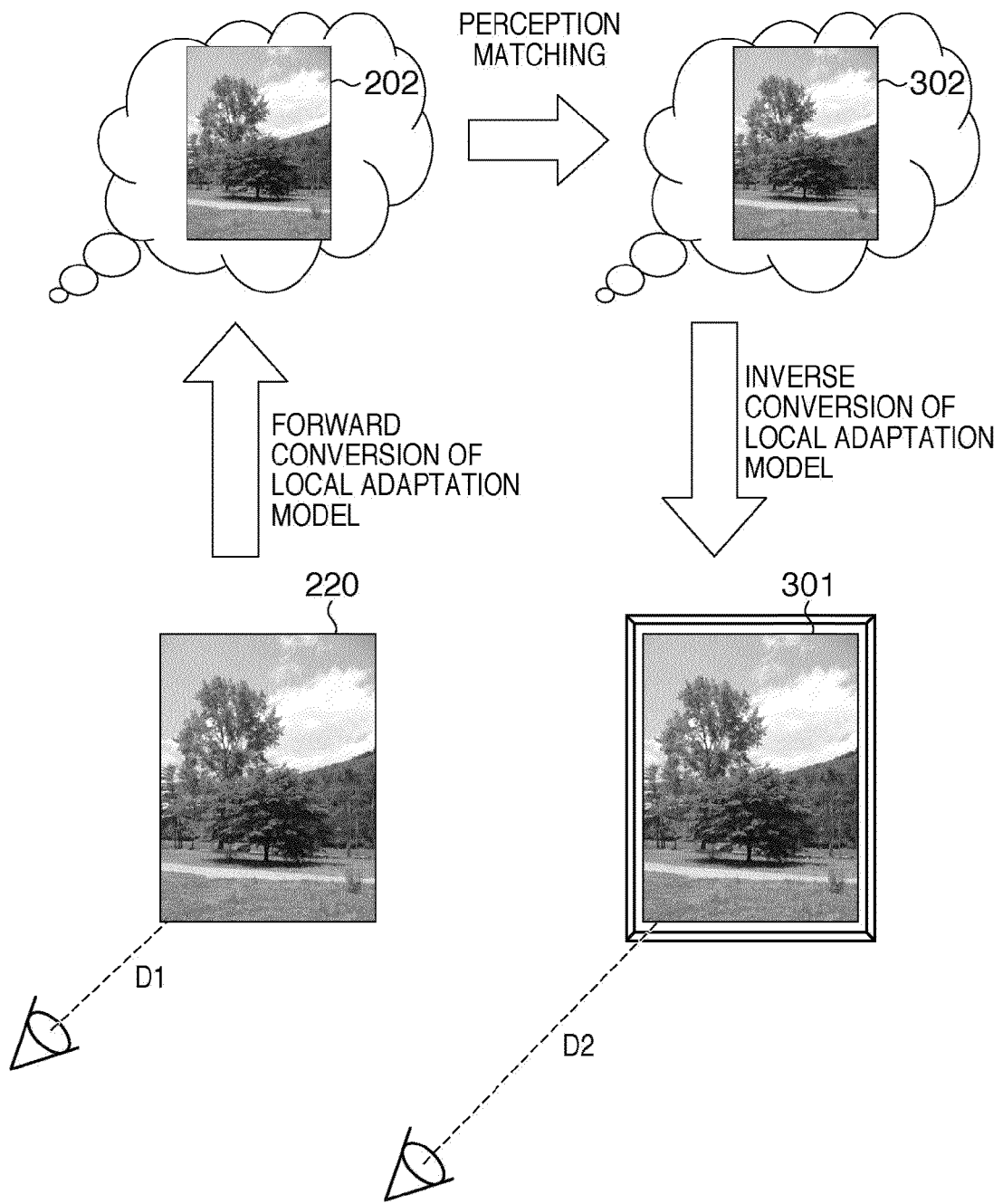
FIG. 5 is a diagram useful in describing a system for obtaining a reproduced image obtained by perception matching from a captured image.

When processing is actually executed, however, what is obtained is the reproduced image 301 that is the result of perception matching from the captured image 220, and therefore use is made of the system shown in FIG. 5, which is obtained by modifying the system of FIG. 4, taking the above factors into consideration.

FIG. 5 is a diagram useful in describing a system for obtaining the reproduced image 301 obtained by perception matching from the captured image 220.

Specifically, a first perceived image 202 is generated by a forward conversion of a local adaptation model from the captured image 220. Then, a second perceived image 302, which is obtained by perception matching from the first perceived image 202, is generated. Finally, the reproduced image 301 is generated by an inverse conversion of an adaptation model from the second perceived image 302.

[Local Adaptation Model]

An example of local adaptation processing is retinex processing described for example in Jobson et al., "A Multiscale Retinex for Bridging the Gap Between Color Images and the Human Observation of Scenes", IEEE TRANSACTIONS ON IMAGE PROCESSING, VOL. 6, NO. 7, July 1997. According to this technical paper, illumination conditions and reflectance are separated from a digital image and the dynamic range of lightness based upon illumination is compressed. However, illuminating conditions and reflectance cannot be observed upon being separated. Accordingly, the illuminating conditions are predicted using the low-frequency components of the image. To achieve this, low-frequency components are extracted from components that have been obtained by logarithmically converting a digital image, and processing for finding the difference between the logarithmically converted components and the low-frequency components is executed. As a result, processing for compressing the low-frequency components is executed, and the dynamic range of lightness based upon illumination is compressed by darkening bright area in the low-frequency component of the digital image and brightening dark area in the low-frequency component of the digital image. Furthermore, in multi-scale-retinex (MSR) processing, local adaptation processing is executed upon extracting a plurality of low-frequency components.

Figure 6:
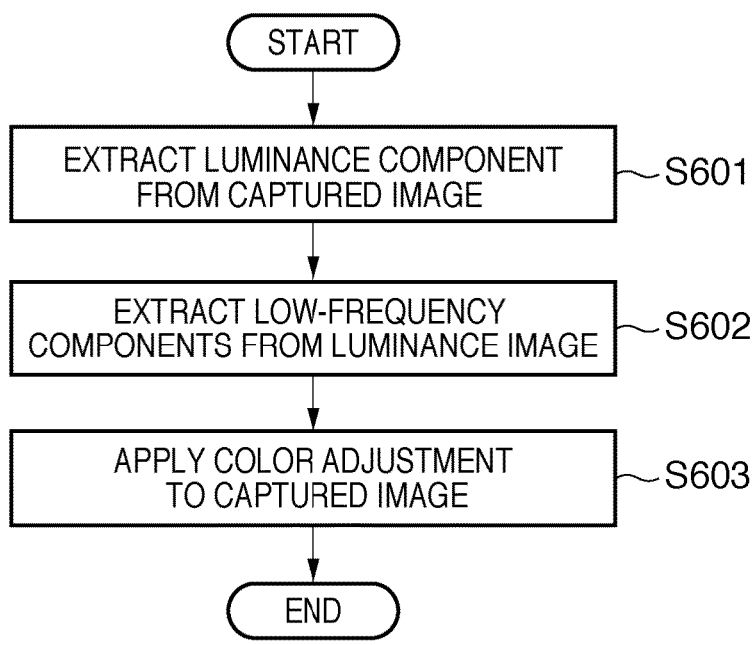
FIG. 6 is a flowchart useful in describing processing for compressing dynamic range of low-frequency components.

FIG. 6 is a flowchart useful in describing processing for compressing dynamic range of low-frequency components. This processing is executed by the CPU 104.

First, a luminance component is extracted from the captured image 220 and a luminance image resulting from the extraction is stored in a prescribed area of the RAM 106 or data storage unit 102 (S601).

In a case where the captured image 220 is expressed in sRGB space defined by IEC 61966-2-1, for example, the extraction of the luminance component involves making a conversion to CIE1931XYZ data by a gamma conversion and 3×3 matrix computation in accordance with the method described in IEC 61966-2-1. Here if XYZ values obtained after converting the values RGB(x,y) of a pixel (x,y) are represented by XYZ(x,y), then Y(x,y) will be the luminance component extracted. Further, X(x,y) and Z(x,y) are chromatic components. If the extraction of this luminance component is implemented by hardware, then the implementation can be achieved by a table reference circuit (gamma converter), which relies upon a look-up table, and a matrix computation circuit, by way of example.

It should be noted that the extraction of the luminance component may also be performed using only a matrix computation, with the gamma conversion being eliminated. Further, the color spaces cited below may be utilized instead of CIE1931XYZ. Naturally, use would be made of color-space conversions that correspond to these color spaces.

The Y value of YCbCr color space is made the luminance value and the Cb, Cr values are made the chromatic components.

The L* value of Lab color space is made the luminance value and the a*, b* values are made the chromatic components.

The J value of JCH color space is made the luminance value and the C, H values are made the chromatic components.

The V value of HSV color space is made the luminance value and the H, S values are made the chromatic components.

The L value of HSL color space is made the luminance value and the H, S values are made the chromatic components.

Further, although an example in which the captured image 220 is an sRGB image has been described, it will suffice to convert an image such as, e.g., an AdobeRGB image or RIMM/ROMM RGB image to CIE1931XYZ (or to the above-mentioned color spaces) in accordance with the definitions of these color spaces.

Further, an expression format of unsigned integers of 8 to 16 bits is used widely as the RGB expression method. It is self-evident, however, that this embodiment is not dependent upon the RGB expression scheme or bit length, etc. Accordingly, this embodiment is applicable to digital images of signed/unsigned integral values of less than eight bits or more than 16 bits, as a matter of course, and also to digital images of real numerical values of fixed- or floating point representation.

Further, although the conversion of color space uses a conversion in accordance with the definition of each color space and conversion formula, the conversion may just as well be made using an ICC profile, etc. For example, use of the ICC profile is particularly effective in a case where the digital image data has device-dependent RGB values (device RGB values) and conversion of color space based upon a simple conversion formula cannot be performed.

Further, even if the captured image 220 is expressed in, e.g., sYCC, it will suffice if the conversion is similarly performed using a color-space conversion formula from sYCC to CIE1931XYZ or using the ICC profile. However, in a case where the color space of the image and the color space of the luminance value agree, as in a case where the captured image 220 is expressed in sYCC and Y of YCbCr is used as the luminance value, the Y value need only be extracted from the sYCC data and conversion of color space will be unnecessary.

Next, the low-frequency components of the luminance image are extracted and the low-frequency components of the luminance image resulting from the extraction are stored in a prescribed area of the RAM 106 of data storage unit 102 (S602). The extraction of the low-frequency components involves subjecting the luminance image to well-known low-pass filter processing such as that of a Gaussian filter. Preferably, edge-preserving filter processing, e.g., a well-known bilateral filter, etc., is applied as the low-pass filter.

Next, the captured image 220 is subjected to a color adjustment by referring to the low-frequency components of the luminance image (S603).

In accordance with a method based upon retinex processing, as an example of color adjustment processing, distributions of luminance components and of scale-converted luminance components are logarithmically converted and the differences between the converted distributions are obtained. Furthermore, a weighted mean of differences of different scales (different resolutions) is adopted as an improved luminance component. However, this method is incapable of adjusting the degree of improvement in accordance with the image. Accordingly, the result of the logarithmic conversion of the scale-converted luminance component is multiplied by a coefficient. The coefficient is a parameter that adjusts the degree of improvement. An improved luminance component that is based upon this processing is indicated by the equation below.

$$Y' = \Sigma_n w_n \{\gamma 0 \cdot \log Y - \gamma 1 \cdot \log(F_n * Y)\} \quad (1)$$

where Y represents a luminance component of pixel (x,y);
$F_n$ represents a Gaussian function in coordinates (x,y);
Wn represents weighting between scales;
n is a parameter representing scale;
$\gamma_0$, $\gamma_1$ are parameters representing degree of improvement; and
* represents a convolution.

It should be noted that the weighting $w_n$ between scales can be dispensed with (replaced by a simple average) by adjusting the standard deviation of scale. Further, it will be understood from Equation (1) that returning to the original luminance units by an inversion conversion (exp computation) is preferred over using a logarithmically converted value in terms of obtaining a higher image quality for the improved image. Accordingly, it is more desirable that the improved luminance component Y' be obtained by the following equation:

$$Y' = \exp[\gamma 0 \cdot \log Y - \gamma 1 \cdot \text{Ave}\{\log(F_n * Y)\}] \qquad (2)$$

where Avg represents computation of average value.

Further, Equation (3) below may be used instead of Equation (2).

$$Y' = Y^{\gamma 0}/\{\text{Avg}(F_n * Y)\}^{\gamma 1} \qquad (3)$$

It should be noted that the computation of average value after scale conversion at a plurality of scales may be performed in the extraction of low-frequency components of the luminance image at step S603, and the average value after scale conversion at a plurality of scales may be adopted as a distribution of scale-converted luminance components.

Alternatively, use may be made of the following equation whereby a result similar to that of Equations (2) and (3) is obtained:

$$Y' = \text{Avg}\{Y^{\gamma 0}/(F_n * Y)^{\gamma 1}\} \qquad (4)$$

In a case where processing for obtaining this improved luminance component Y' is implemented by hardware, implementation can be achieved by an average-value computation circuit, a circuit for creating a look-up table, a table storage unit, a table reference circuit (gamma converter) and a subtracting circuit. It should be noted that the average-value computation circuit may be provided in the arrangement that extracts low-frequency components from the luminance image.

Figure 7:
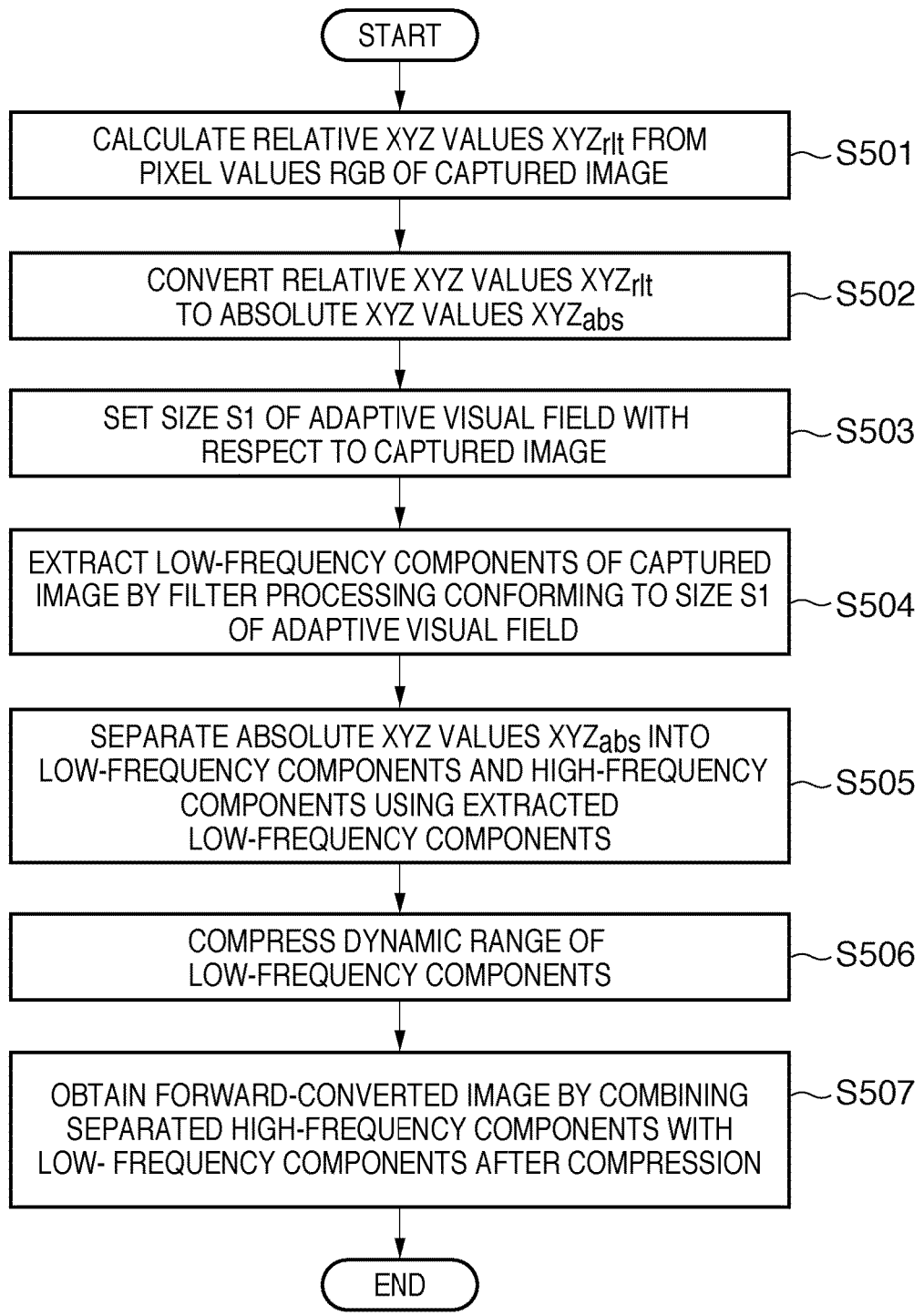
FIG. 7 is a flowchart useful in describing local adaptation processing in line with iCAM06.

With respect to the compression (forward conversion) of dynamic range of low-frequency components of luminance using the local adaptation model, it is similarly possible to implement an inversion conversion of a local adaptation model for extracting low-frequency components of luminance and expanding the dynamic range of the extracted low-frequency components. Although only the dynamic range of luminance components is mentioned here, similar processing may be applied to the dynamic range of chromatic components and not just to luminance components. In a case where, e.g., XYZ data is processed, the forward conversion and inversion conversion of dynamic range of chromatic components involves extracting low-frequency components with regard to each channel of XYZ and calculating the improved components of the corresponding channel according to any of Equations (1) to (4) using the extracted low-frequency components.

iCAM06 method calculates absolute luminance of the image to be processed and executes local adaptation processing using the absolute luminance calculated. FIG. 7 is a flowchart useful in describing local adaptation processing in line with iCAM06. This processing is executed by the CPU 104.

First, Equation (5) below is applied to the pixel values RGB of the captured image 220 to thereby calculate relative XYZ values $XYZ_{rlt}$ (S501). If the pixel values of the captured image 220 are RGB values that are linear with respect to the amount of light, then application of Equation (5) alone will be sufficient. However, in case of RGB values that are non-linear with respect to the amount of light, then Equation (5) is applied after a conversion is made to linear RGB values by performing, e.g., a gamma correction (for example, the gamma correction described in IEC61966-2-1).

$$\begin{bmatrix} X_{rlt} \\ Y_{rlt} \\ Z_{rlt} \end{bmatrix} = \begin{bmatrix} 0.41 & 0.36 & 0.18 \\ 0.21 & 0.71 & 0.07 \\ 0.02 & 0.12 & 0.95 \end{bmatrix} \begin{bmatrix} R \\ G \\ B \end{bmatrix} \qquad (5)$$

Next, the relative XYZ values $XYZ_{rlt}$ are converted to absolute XYZ values $XYZ_{abs}$ by the equation below using maximum luminance Lm[cd/m$^2$] (S502). Acquisition of maximum luminance Lm will be described later.

$$\begin{bmatrix} X_{abx} \\ Y_{abs} \\ Z_{abs} \end{bmatrix} = \left[\frac{Lm}{255}\right] \begin{bmatrix} X_{rlt} \\ Y_{rlt} \\ Z_{rlt} \end{bmatrix} \qquad (6)$$

The constant 255 in Equation (5) is a value for normalizing the luminance value in a case where each channel of the RGB data is an 8-bit unsigned integer. Accordingly, the constant is changed suitably in accordance with the definition of the RGB data.

Next, a size S1 of the adaptive visual field is set with respect to the captured image 220 (S503), filter processing conforming to this size is executed and low-frequency components of the captured image 220 are extracted (S504). A method of setting the size S1 of the adaptive visual field will be described below.

By way of example, in a case where a well-known Gaussian filter is used to extract the low-frequency components, the filter processing is represented by the following equation:

$$\text{Filter }(a, b) = 1/k \cdot \exp\{1-(a^2+b^2)/2\sigma^2\} \qquad (7)$$

$$\text{where } k = \sum_{a=i}^{+i}\sum_{b=-i}^{+i}\exp\{-(a^2+b^2)/2\sigma^2\};$$

where $k = \sum_{a=i}^{+i}\sum_{b=-i}^{+i}\exp\{-(a^2+b^2)/2\sigma^2\}$;
(a,b) represents relative coordinates from the pixel at the center of the filter; and
σ is a standard deviation.

If S1 is the size of the adaptive visual field, then the filter size conforming to the size of the adaptive visual field is set by adopting S1/2 as the standard deviation σ in Equation (7) and adopting S1/2 as radius i of the filter size. In other words, the filter is set in such a manner that with the size S1 of the adaptive visual field and the filter size being (approximately) equal, the shapes of the coefficients will be similar figures in accordance with the size of the adaptive visual field. It should be noted that the standard deviation σ=S1/2 is one example; it will suffice if the corresponding relationship is such that the standard deviation σ increases as the size S1 of the adaptive visual field increases.

In this embodiment, an arrangement is adopted in which the radius i of the filter size is made S/2, which is the same as the value of the standard deviation σ, and is changed in accordance with the size S1 of the adaptive visual field in such a manner that many integrated values of coefficients will be included. However, it is also possible to adopt an approximation method in which the filter size is fixed independently of the size S1 of the adaptive visual field. In a case where this embodiment is implemented by software or hardware, fixing filter size is advantageous in that processing time is fixed for software implementation, and in that such implementation is easy or makes it possible to reduce the necessary amount of memory for hardware implementation.

Next, the absolute XYZ values $XYZ_{abs}$ of the captured image 220 obtained from Equation (6) are separated into low-frequency components and high-frequency components (S505) using the low-frequency components extracted at step S504. The dynamic range of the low-frequency components is then compressed (S506) and the separated high-frequency components are combined with the low-frequency components after compression, whereby the processed pixel values (forward-converted image) are obtained (S507). As for the degree of compression of dynamic range of the low-frequency components at this time, compression conforming to the values of the low-frequency components is performed in accordance with the response characteristic of the human eye to light. This need not be described here.

Thus, local adaptation processing in line with iCAM06 also is compression (forward conversion) of the dynamic range of low-frequency components, which is similar to the retinex processing described earlier. Accordingly, if the dynamic range of the low-frequency components of a forward-converted image is subjected to expansion processing, an inverse conversion of local adaptation processing can be implemented.

[Use of Profile]

In the image processing of this embodiment, the data mentioned below is used in addition to the data of the captured image 220. It should be noted that these profiles have been stored in the data storage unit 102 in the prescribed format. The profiles are as follows:
capture condition profile;
input device profile;
viewing condition profile; and
output device profile (information indicating the color reproduction characteristic of a printer).

Capture Condition Profile

The capture condition profile is data in which are described the conditions that prevailed when the captured image 220 was captured. It includes at least the following information:
information relating to the viewing angle of the camera 203;
information relating to the distance D1 between the subject and the camera 203; and
information relating to the image resolution of the camera 203.

The information relating to viewing angle is information required in order to specify the viewing angle at the time of capture. Although the viewing angle per se may be used, it can be specified from focal length and zoom magnification or from the dimensions of the imaging surface and the lens used in capture. If it is assumed that the lens is free of distortion, then viewing angle α can be calculated from the following equation:

$$\alpha = 2 \cdot \tan^{-1}[d/\{2F(1+m)\}] \tag{8}$$

where d represents the dimensions of the imaging surface;
F is the focal length of the lens; and
m represents the zoom magnification.

In Equation (8), the viewing angle in the horizontal direction is obtained if the horizontal length of the imaging surface is made the dimension d, and the viewing angle in the vertical direction is obtained if the vertical length of the imaging surface is made the dimension d.

Of course, instead of calculating the viewing angle α using Equation (8), a table may be created by investigating the dimension d of the imaging surface, the focal length F of the lens and the viewing angle α with respect to zoom magnification, and deciding the viewing angle α by referring to the table. Although there is a possibility that the focal length F and zoom magnification m will vary continuously in this case, it will suffice to create the table using sampled values and calculate the viewing angle α by interpolation. Further, since in many cases the dimension d of the imaging surface is uniquely decided by the camera 203 or lens, a table indicating the dimension d corresponding to the camera 203 or name of the lens or identifying name may be created.

Further, in a case where the camera 203 is a digital camera, the information relating to the distance D1 is obtained from the information on subject distance described in an Exif tag. The distance information obtained as by rangefinding may be stored on the recording medium 221 of the camera in association with the captured image 220 and may be utilized as information relating to the distance D1. Further, the information relating to image resolution is related to the numbers of pixels in the horizontal and vertical directions of the captured image 220. In a case where the camera 203 is a digital camera, it will suffice to acquire the number of pixels described in the Exif tag. The user may of course be allowed to input the distance D1 and number of pixels via the GUI displayed on the display unit 103.

When the viewing angle θ relating to local adaptation (referred to below as the "adaptive viewing angle") is set, the size S1 of the adaptive visual field in the viewing of the real-world scene 201 corresponding to the adaptive viewing angle θ can be calculated from the information in the capture condition profile. The area represented by the adaptive viewing angle θ is the area 211 in FIG. 2, and the size S1 of the adaptive visual field is the number of pixels representing the diameter of the area of image 220 corresponding to the area 211. In other words, the size S1 of the adaptive visual field can be calculated from the adaptive viewing angle θ and viewing angle α using the following equation:

$$S1 = \tan(\theta/2)/\tan(\alpha/2) \times W \tag{9}$$

where W represents the width of the captured image (the number of pixels in the horizontal direction).

Figure 12:
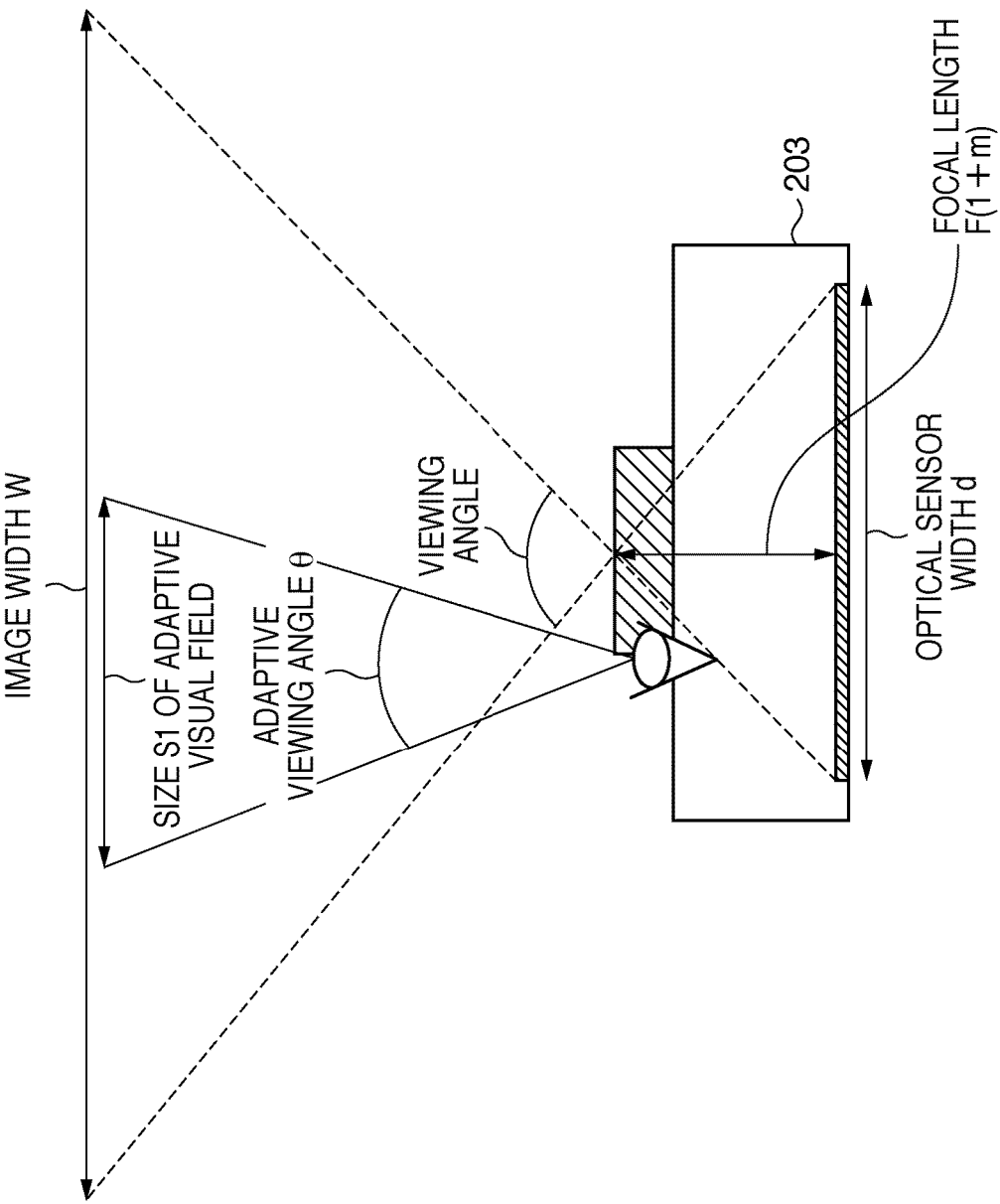
FIG. 12 is a diagram illustrating the relationship among image width, size of adaptive visual field, adaptive viewing angle, viewing angle, focal length and optical-sensor width (dimension of imaging surface).

FIG. 12 is a diagram illustrating the relationship among image width W, size S1 of the adaptive visual field, adaptive viewing angle θ, viewing angle, focal length and optical-sensor width (dimension of imaging surface) d.

Input Device Profile

The input device profile is information indicating the input characteristic of the camera 203 and includes at least information relating to the range of colors capable of being captured by the camera 203. The information indicating the input characteristic is data necessary in order to calculate the absolute luminance value of the captured image 220. For example, this may be the maximum capturable luminance Lm per se or a range of luminances capable of being captured. In the case of a digital camera, exposure time T, f-stop number F at the time of capture and ISO sensitivity ISO may be used as the information indicating the input characteristic. In this case, the AV value, TV value, SV value and BV value of the APEX standard are calculated according to the following equations:

$$AV \text{ (aperture value)} = 2 \cdot \log_2 F$$

$$TV \text{ (shutter speed value)} = -\log_2 T$$

$$SV \text{ (film speed value)} = \log_2(ISO/3.0) \tag{10}$$

$$BV \text{ (brightness value)} = AV + TV - SV$$

Furthermore, the maximum luminance Lm is calculated according to the following equation using the BV value:

$$Lm = 3.462 \times 2^{BV}/18.0 \times 201.0 \tag{11}$$

Viewing Condition Profile

The viewing condition profile is data in which are described the viewing conditions that prevail when the reproduced image 301 is viewed. It includes at least the following information:

information relating to the size of the reproduced image 301; and information relating to the distance D2 between the reproduced image 301 and viewer.

The information relating to the size of the display image includes the physical dimensions in a case where the entire captured image 220 is displayed. For example, in a case where the image is displayed on a monitor, the information relates to the dimensions of the display area of the monitor. In other words, if the entire reproduced image 301 is displayed on the entire monitor screen, the dimensions of the monitor display area constitute the information. Further, in a case where the entire reproduced image 301 is displayed on part of a multiwindow, the dimensions of the display area of this window constitute the information. If part of the captured image 220 is displayed as the reproduced image 301, then the dimensions in a case where the entire captured image 220 is displayed is virtually decided from the ratio between the number of pixels of the portion displayed and the display area of the monitor.

As for the information relating to the size of the print image, it will suffice to acquire the settings of the print paper from the print settings information and specify the dimensions of the print area.

With regard to the distance D2, the user is allowed to input the distance D2 via the GUI displayed on the display unit 103. Further, the standard distance D2 with respect to the reproduced image 301 may be set in advance and then used. For example, if the display is the monitor of a personal computer, it will suffice if the distance D2 is set to a range of 50 cm to 1 m. Alternatively, a length obtained by multiplying the height (or width) of the display area by a prescribed coefficient may be set as the standard distance D2. Of course, an arrangement may be adopted in which standard distances D2 are adopted as default values and distance D2 can be changed in accordance with a designation by the user.

If the adaptive viewing angle θ is set, size S2 of the adaptive visual field in viewing of the reproduced image 301 corresponding to the adaptive viewing angle θ is can be calculated from the information in the viewing condition profile.

$$S2 = D2 \cdot \tan(\theta/2) \times W/w \tag{12}$$

where W is the width of the entire reproduced image 301; and w is the display width of the reproduced image 301.

It should be noted that in a case where the entire reproduced image 301 is displayed, W=w holds if the reproduced image 301 is a print image.

Figure 13:
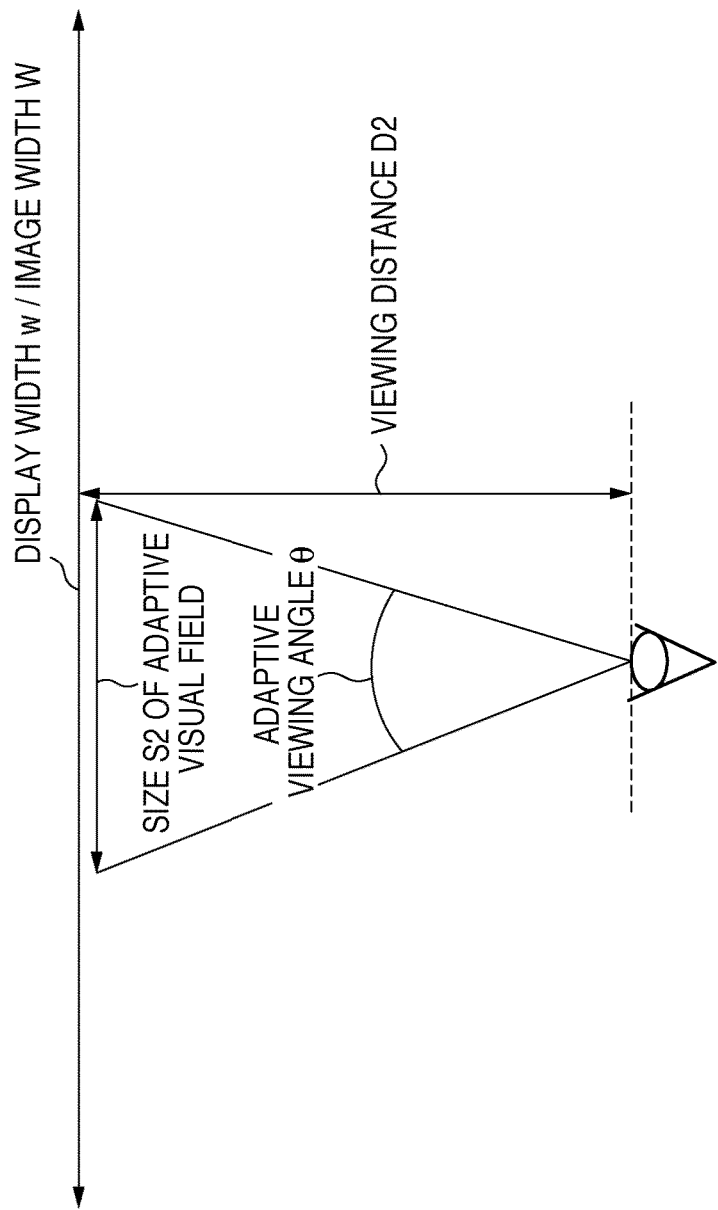
FIG. 13 is a diagram illustrating the relationship among the display width and image width of a reproduced image, size of adaptive visual field, adaptive viewing angle and viewing distance.

FIG. 13 is a diagram illustrating the relationship among the display width w and image width W of the reproduced image 301, the size S2 of the adaptive visual field, the adaptive viewing angle θ and the viewing distance D2.

Output Device Profile

The output device profile is data in which is described information indicating the characteristic of an image output device such as a monitor or printer and includes at least information relating to the range of colors capable of being reproduced by the image output device. In a manner similar to the input device profile, the information may be the maximum luminance Lm per se that can be output by the image output device or a range of luminances capable of being output. In the case of a printer, printing paper need only be placed in the viewing environment (under the viewing light source) of the reproduced image 301 and the paper white measured. Of course, a table indicating the result of measuring the luminance of paper white may be created with regard to various combinations of printing paper and viewing light sources, and the maximum luminance Lm may be calculated by interpolation as necessary.

[Image Processing]

Figure 8:
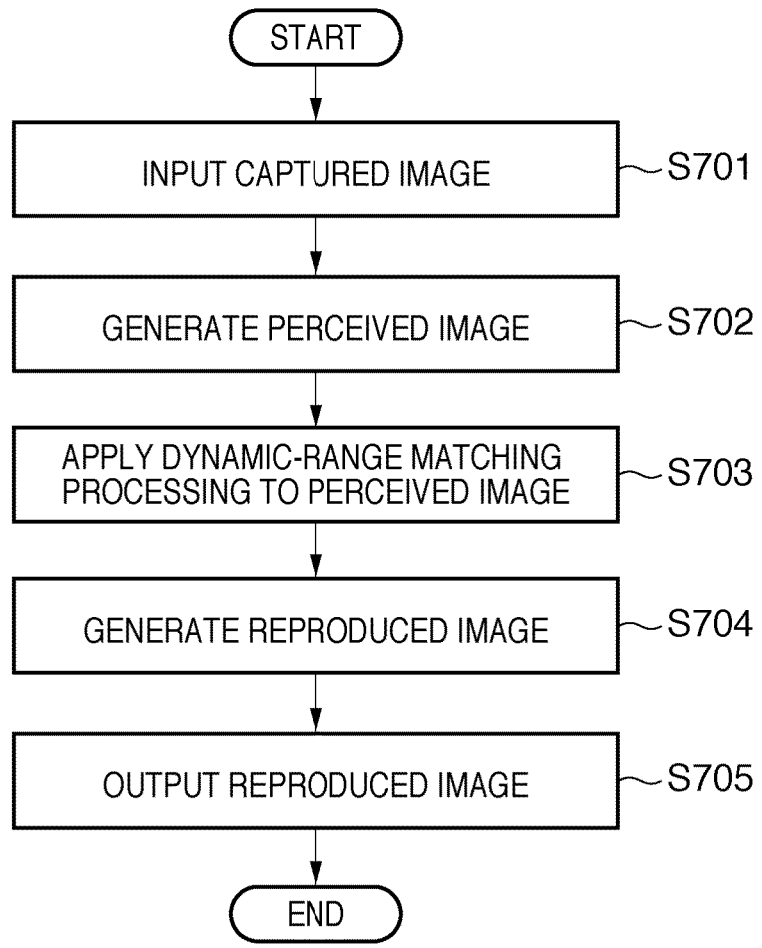
FIG. 8 if a flowchart illustrating image processing according to an embodiment.

FIG. 8 if a flowchart illustrating image processing according to an embodiment. This processing is executed by the CPU 104.

First, the captured image 220 that has been stored in the data storage unit 102 in the prescribed format is read in and loaded in the RAM 106 (S701). Alternatively, the captured image 220 may be input from the recording medium 221 of camera 203 via the communication interface 107. The processing set forth below may be executed using the input of the captured image 220 as the trigger.

Next, the captured image 220 is subjected to the forward conversion processing of the local adaptation model illustrated in FIG. 6 or 7 and the perceived image 202 shown in FIG. 5 is generated (S702).

Figure 9:
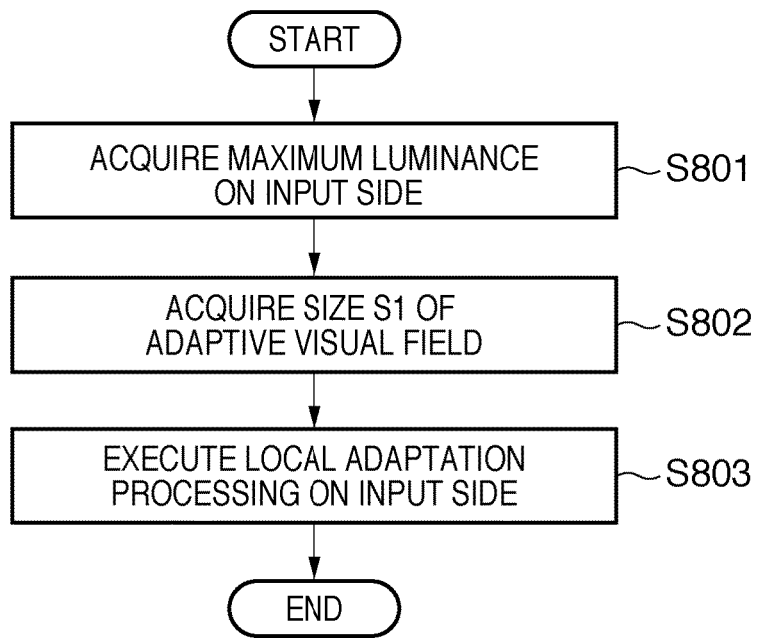
FIG. 9 is a flowchart for describing forward conversion processing.

FIG. 9 is a flowchart for describing the forward conversion processing. First, the maximum luminance Lm on the input side is acquired from the input device profile (S801). The S1 of the adaptive visual field is then computed from the capture condition profile using Equation (9) (S802). The captured image 220 is then subjected to local adaptation processing (forward conversion) on the input side to thereby generate the perceived image 202 (S803).

Next, matching processing for making the dynamic range of the perceived image 202 conform to the dynamic range of the output device is executed and the perceived image 302 shown in FIG. 5 is generated (S703).

Figure 10:
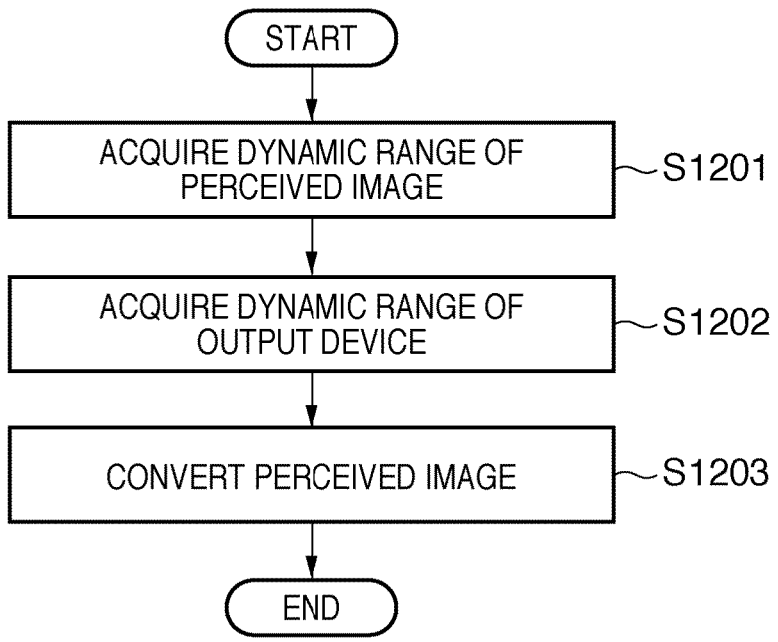
FIG. 10 is a flowchart useful in describing dynamic-range matching processing.

FIG. 10 is a flowchart useful in describing the dynamic-range matching processing (S703). First, the dynamic range of the perceived image 202 is acquired (S1201). In other words, the XYZ values of each pixel of the perceived image 202 is investigated and the maximum value Y1max of Y is acquired. The dynamic range of the output device is then acquired (S1202). In other words, the maximum luminance Lm capable of being output by the output device or the luminance of paper white is acquired as the maximum value Y2max from the output device profile. The perceived image 202 generated at step S702 is then converted to the perceived image 302 using Y1max, Y2max (S1203). In this embodiment, the signal value of each pixel is simply converted in accordance with the ratio between the two maximum values of luminance. In other words, the conversion of the following equation is applied to the Y value of each pixel and the pixel values XY'Z after conversion are made the pixel values of the perceived image 302:

$$Y' = Y \times Y2\max/Y1\max \tag{13}$$

It should be noted that not only is the Y value processed by Y2max/Y1max but a conversion in which Y2max/Y1max is applied to the X value and Z value as well is possible. Further, maximum values of the X and Z components on the input and output sides may be found in a manner similar to that of the Y component, and the X and Z values may be converted in accordance with respective ones of these maximum values.

Further, a conversion corresponding to Equation (13) may be executed taking into consideration not only the maximum values of the signal components but also the minimum values of the signal components. Furthermore, the conversion of Equation (13) is a linear conversion but may just as well be made a non-linear conversion or a conversion that applies a well-known color matching scheme.

Next, the perceived image 302 is subjected to inverse conversion processing of the local adaptation model, the reproduced image 301 shown in FIG. 5 is generated (S704) and the reproduced image 301 is output to the output device (S705).

Figure 11:
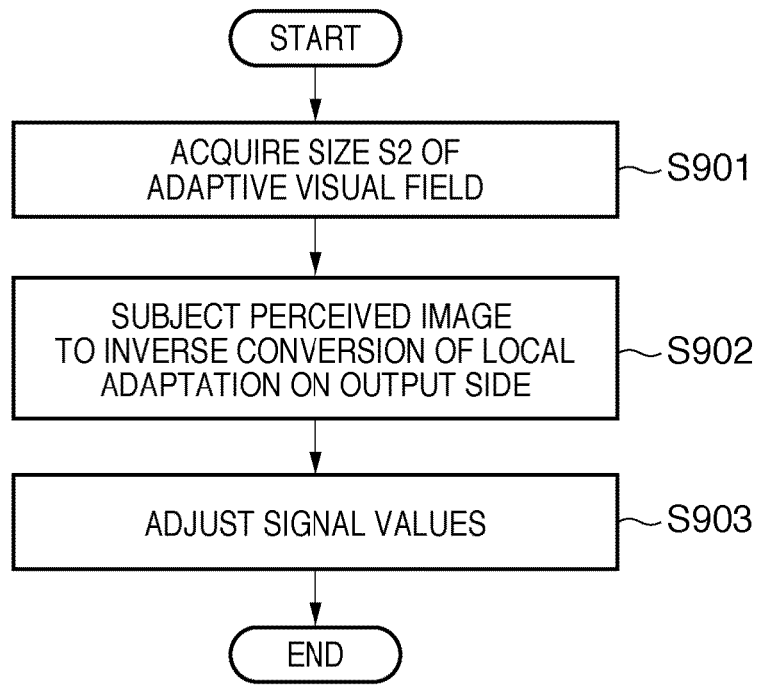
FIG. 11 is a flowchart useful in describing inverse conversion processing of a local adaptation model.

FIG. 11 is a flowchart useful in describing the inverse conversion processing (S704) of the local adaptation model. First, the size S2 of the adaptive visual field is calculated using Equation (12) based upon the information in the viewing condition profile (S901). The perceived image 302 is subjected to inverse conversion processing corresponding to the local adaptation when the reproduced image 301 is viewed (S902). In other words, as mentioned above, the low-frequency components are subjected to expansion processing. Furthermore, the image that is the result of the inverse conversion is adjusted to thereby generate the reproduced image 301 (S903). This is processing for adjusting the image in such a manner that the signal values of the image will fall within the allowable signal range of the output device in a case where, as a result of the expansion processing of the low-frequency components, the signal values exceed the allowable signal range.

The adjustment at step S903 may be performed using the XYZ values or may be performed after the XYZ values are converted to RGB values by the inverse conversion of Equations (5) and (6). If the adjustment is carried out after the conversion to the RGB values, generally each of the RGB values of the RGB image is expressed by an 8-bit integral value and the signal value of each channel ranges from 0 to 255. Accordingly, the simplest adjustment method is to clip a negative value and a value that exceeds 255 to 0 and 255, respectively, if such values are obtained by the inverse conversion of step S902. It is of course also permissible to find the maximum and minimum signal values of the image after the inverse conversion and normalize the signal values of the entire image in such a manner that these maximum and minimum values become 255 and 0, respectively.

In a case where the reproduced image 301 is output to the display unit 103, processing is executed using the output device profile of the display unit 103 and the viewing condition profile of the reproduced image 301 displayed on the display unit 103. This enables the generation of the reproduced image 301 conforming to the local adaptation when the real-world scene 201 is viewed. Accordingly, the impression received when the reproduced image 301 is viewed can be made to conform (or approach) the impression received when the real-world scene 201 was viewed. Naturally, in a case where the reproduced image 301 is printed, similar results are obtained if processing is executed using the output device profile of the printer and the viewing condition profile of the print image. In other words, by executing image processing conforming to the low-frequency components of the image, a disparity in the dynamic ranges of the input device and output device can be eliminated in ideal fashion and the impression received when the real-world scene is viewed can be made to agree with the impression received when the reproduced image is viewed.

It should be noted that in this embodiment, there is no limitation upon the size relationship between the signal value range on the input side and the signal value range on the output side, and it is self-evident that the invention operates in ideal fashion both in a case where the signal value range on the input side is broader than the signal value range on the output side, and vice versa.

Second Embodiment

Image processing according to a second embodiment of the present invention will now be described. Components in the second embodiment similar to those of the first embodiment are designated by like reference characters and need not be described again in detail.

In the example described in the first embodiment, only the maximum luminance Lm capable of being input by the input device is used by reason of the fact that the input device profile is assumed to contain at least the information representing the maximum luminance Lm capable of being input. In the second embodiment, a case where the input device profile further contains information representing the tone characteristic of the input device will be described.

In the example described in the first embodiment, linearity of the input signal values is assumed or, in a case where the input signal values are non-linear, processing is executed upon linearizing these values using a gamma conversion or the like. In an actual device, however, a case where linearity of the input signal does not hold is also possible. In such case a table indicating the corresponding relationship between the signal values and relative XYZ values or between the signal values and absolute XYZ values is stored on the input device profile as information representing the tone characteristic of the image input device, and the table is used when an input signal is converted from RGB values to XYZ values.

In order to acquire the tone characteristic, it will suffice to subject a color chart or the like to colorimetry, capture the color chart by the target image input device and place the relationship between the calorimetric values and the signal values of the image input device in the form of a table.

Further, in the first embodiment, the description is rendered using only the maximum luminance Lm by reason of the fact that the output device profile is assumed to contain at least the information indicating the maximum luminance Lm capable of being output by the output device. However, it may be so arranged that the output device profile includes information representing the tone characteristic of the output device in a manner similar to the input side.

In accordance with the second embodiment in which reference is had to the tone characteristic, local adaptation processing more in line with the characteristics of the device than in the first embodiment can be executed.

Modification of Embodiments

In the embodiments set forth above, the description assumes that the aspect ratio of the captured image 220 is maintained in the reproduced image 301. Owing to the particulars of the display, however, there are also cases where the aspect ratio is not maintained. In such cases processing for changing the aspect ratio is added on between steps S703 and S704 in the processing shown in FIG. 8.

Furthermore, a filter having a circular region of interest has been described as a filter for extracting low-frequency components. In a case where the aspect ratio is changed, information representing the change in aspect ratio is stored in the viewing condition profile and the region of interest of the filter in the local adaptation processing on the output side is controlled in accordance with such profile.

FIG. 14 is a diagram illustrating the relationship between a change in aspect ratio of an image and shape of an adaptive visual field.

In FIG. 14, an image 1301 prior to conversion of aspect ratio becomes an image 1302 as a result of changing the aspect ratio (expanding it in the horizontal direction). Accordingly, the adaptive visual field in the image 1302 need only be reduced by an amount to offset the expansion to thereby obtain an adaptive visual field 1303 in the image 1301.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-223919, filed Sep. 1, 2008, which is hereby incorporated by reference herein in its entirety.

What is claimed is:

1. An image processing apparatus comprising:
a first input section, configured to input a captured image, and capture conditions of an image input device when the captured image was captured, wherein the capture conditions include information indicating viewing angle between said image input device and a subject, distance from said image input device to said subject, and image resolution of the captured image;
a second input section, configured to input viewing conditions when a reproduced image, which is reproduced by an image output device, is viewed;
a forward converter, configured to generate a first perceived image from low-frequency components separated from the captured image by a forward conversion of a local adaptation processing in a human vision model that is determined based on the information which indicates the viewing angle, the distance to the subject and the image resolution of the captured image;
a generator, configured to generate a second perceived image by converting a dynamic range of the first perceived image to a dynamic range of the image output device; and
an inverse converter, configured to generate a reproduced image, which is supplied to the image output device, from the second perceived image by an inverse conversion of the local adaptation processing that is determined based on information, which relates to viewing distance and size of the reproduced image, included in the viewing conditions.

2. The apparatus according to claim 1, wherein the generator performs the conversion based on maximum luminance that the image input device can input and maximum luminance that the image output device can reproduce.

3. The apparatus according to claim 1, wherein the generator performs the conversion based on a luminance range that the image input device can input and a luminance range that the image output device can reproduce.

4. The apparatus according to claim 1, wherein the forward converter compresses the dynamic range of the low-frequency components.

5. The apparatus according to claim 4, wherein a maximum frequency of the low-frequency components to be separated from the captured image is in inverse proportion with the distance to the subject.

6. The apparatus according to claim 1, wherein the inverse converter generates the reproduced image so that the second perceived image is obtained by compressing the dynamic range of low-frequency components separated from the reproduced image.

7. The apparatus according to claim 6, wherein a maximum frequency of the low-frequency components to be separated from the reproduced image is in inverse proportion with the viewing distance.

8. An image processing method comprising:
using a processor to perform the steps of:
inputting a captured image and capture conditions of an image input device when the captured image was captured, wherein the capture condition include information indicating viewing angle between said image input device and a subject, distance from said image input device to said subject, and image resolution of the captured image
inputting viewing conditions when a reproduced image, which is reproduced by an image output device, is viewed;
generating a first perceived image from low-frequency components separated from the captured image by a forward conversion of a local adaptation processing in a human vision model that is determined based on the information, which indicates the viewing angle, the distance to a the subject and the image resolution of the captured image; generating a second perceived image by converting a dynamic range of the first perceived image to a dynamic range of the image output device; and
generating a reproduced image, which is supplied to the image output device, from the second perceived image by an inverse conversion of the local adaptation processing that is determined based on information, which relates to viewing distance and size of the reproduced image, included in the viewing conditions.

9. A non-transitory computer-readable medium storing a computer-executable program for causing a computer to perform an image processing method, the method comprising the steps of:
inputting a captured image and capture conditions of an image input device when the captured image was captured, wherein the capture conditions include information indicating viewing angle between said image input device and a subject, distance from said image input device to said subject, and image resolution of the captured image;
inputting viewing conditions when a reproduced image, which is reproduced by an image output device, is viewed;
generating a first perceived image from low-frequency components separated from the captured image by a forward conversion of a local adaptation processing in a human vision model that is determined based on the information, which indicates the viewing angle, the distance to a the subject and the image resolution of the captured image;

generating a second perceived image by converting a dynamic range of the first perceived image to a dynamic range of the image output device; and generating a reproduced image, which is supplied to the image output device, from the second perceived image by an inverse conversion of the local adaptation processing is determined based on information, which relates to viewing distance and size of the reproduced image, included in the viewing conditions.

\* \* \* \* \*